(12) United States Patent
Li et al.

(10) Patent No.: US 9,179,328 B2
(45) Date of Patent: Nov. 3, 2015

(54) DOPPLER SHIFT COMPENSATION APPARATUS AND METHOD

(75) Inventors: Mingxin Li, Beijing (CN); Xiaodan Zhang, Beijing (CN); Jing Liu, Beijing (CN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 391 days.

(21) Appl. No.: 13/378,801

(22) PCT Filed: Dec. 6, 2011

(86) PCT No.: PCT/CN2011/083527
§ 371 (c)(1),
(2), (4) Date: Dec. 19, 2012

(87) PCT Pub. No.: WO2013/082754
PCT Pub. Date: Jun. 13, 2013

(65) Prior Publication Data
US 2013/0143503 A1 Jun. 6, 2013

(51) Int. Cl.
*H04W 16/14* (2009.01)
*H04W 24/02* (2009.01)
(Continued)

(52) U.S. Cl.
CPC .......... *H04W 24/02* (2013.01); *H04W 56/0035* (2013.01); *G01S 11/04* (2013.01); *H04W 36/0055* (2013.01); *H04W 64/006* (2013.01); *H04W 92/20* (2013.01)

(58) Field of Classification Search
CPC ........ H04W 24/02; H04W 16/14; H04B 7/26; H04L 1/20
USPC ................................. 455/63.1, 501
See application file for complete search history.

(56) References Cited

U.S. PATENT DOCUMENTS 3,940,695 A * 2/1976 Sickles, II ........................ 455/69
4,016,568 A * 4/1977 Makimoto et al. ............... 342/94
(Continued)

FOREIGN PATENT DOCUMENTS

CN 1124701 C 10/2003
CN 102027387 A 4/2011
(Continued)

OTHER PUBLICATIONS

3GPP TS 36.101 V10.0.0 $3^{rd}$ Generation Partnership Project; Technical Specification Group Radio Access Network; Evolved Universal Terrestrial Radio Access (E-UTRA); User Equipment (UE) radio transmission and reception (Release 10), Oct. 2010.
(Continued)

*Primary Examiner* — Hai V Nguyen
(74) *Attorney, Agent, or Firm* — Baker Botts, LLP (57) ABSTRACT

The present disclosure relates to a Doppler shift compensation scheme applicable in a high mobility communication system. In some examples, a Doppler shift compensation apparatus may include an angle measuring unit configured to measure Angle Of Arrival (AOA) information of a User Equipment (UE); a velocity calculating unit configured to calculate a velocity information of the UE based on the measured AOA information; a frequency shift estimating unit configured to estimate Doppler shift of the UE based on the measured AOA information and the calculated velocity of the UE; a frequency shift compensation triggering unit configured to trigger Doppler frequency shift compensation based on the estimated Doppler shift of the UE; and a frequency shift compensating unit configured to perform the Doppler frequency shift compensation based on a trigger instruction from the frequency shift compensation triggering unit. Doppler shift compensation methods are also described in some other examples of the present disclosure.

16 Claims, 8 Drawing Sheets

(51) Int. Cl.
*H04W 56/00* (2009.01)
*H04W 36/00* (2009.01)
*H04W 92/20* (2009.01)
*H04W 64/00* (2009.01)
*G01S 11/04* (2006.01)

(56) References Cited

U.S. PATENT DOCUMENTS

| | | | |
|---|---|---|---|
| 5,007,068 A * | 4/1991 | Simon et al. | 375/280 |
| 5,095,538 A * | 3/1992 | Durboraw, III | 455/71 |
| 5,396,645 A * | 3/1995 | Huff | 455/441 |
| 5,432,521 A * | 7/1995 | Siwiak et al. | 342/352 |
| 5,519,402 A * | 5/1996 | Kitayoshi | 342/196 |
| 5,525,998 A * | 6/1996 | Geier | 342/357.3 |
| 5,551,059 A * | 8/1996 | Hutcheson et al. | 455/429 |
| 5,585,805 A * | 12/1996 | Takenaka et al. | 342/461 |
| 5,640,166 A * | 6/1997 | Siwiak | 342/354 |
| 5,729,558 A * | 3/1998 | Mobin | 714/795 |
| 5,874,913 A * | 2/1999 | Blanchard et al. | 342/352 |
| 5,884,178 A * | 3/1999 | Ericsson et al. | 455/441 |
| 6,119,013 A * | 9/2000 | Maloney et al. | 455/456.2 |
| 6,163,297 A * | 12/2000 | Rose | 342/418 |
| 6,219,561 B1 | 4/2001 | Raleigh | 455/561 |
| 6,259,919 B1 * | 7/2001 | Suonvieri et al. | 455/441 |
| 6,260,052 B1 * | 7/2001 | Song | 708/300 |
| 6,266,014 B1 * | 7/2001 | Fattouche et al. | 342/450 |
| 6,298,238 B1 * | 10/2001 | Dai | 455/456.2 |
| 6,347,286 B1 * | 2/2002 | Petillon | 702/71 |
| 6,473,594 B1 * | 10/2002 | Piirainen | 455/63.1 |
| 6,614,860 B1 * | 9/2003 | Piirainen | 375/341 |
| 6,639,554 B2 * | 10/2003 | Kim et al. | 342/457 |
| 6,647,276 B1 * | 11/2003 | Kuwahara et al. | 455/562.1 |
| 6,934,547 B2 * | 8/2005 | Suzuki | 455/441 |
| 6,987,482 B2 * | 1/2006 | Sondur | 342/377 |
| 7,012,973 B1 * | 3/2006 | Piirainen | 375/340 |
| 7,109,920 B2 * | 9/2006 | Davenport et al. | 342/418 |
| 7,164,737 B2 * | 1/2007 | Han | 375/344 |
| 7,266,044 B2 * | 9/2007 | Yang | 367/124 |
| 7,269,394 B2 * | 9/2007 | Fei et al. | 455/91 |
| 7,295,812 B2 * | 11/2007 | Haapoja et al. | 455/63.1 |
| 7,313,179 B1 * | 12/2007 | Steiner | 375/224 |
| 7,346,040 B2 * | 3/2008 | Weinstein | 370/339 |
| 7,558,576 B2 * | 7/2009 | Chen et al. | 455/441 |
| 7,602,834 B1 * | 10/2009 | Giallorenzi et al. | 375/130 |
| 7,653,347 B2 * | 1/2010 | Klotsche et al. | 455/10 |
| 7,672,382 B2 * | 3/2010 | Yoshida et al. | 375/260 |
| 7,702,307 B2 * | 4/2010 | Taipale et al. | 455/226.3 |
| 7,792,212 B2 * | 9/2010 | Lee et al. | 375/295 |
| 7,873,336 B2 * | 1/2011 | Fei et al. | 455/130 |
| 7,929,937 B2 * | 4/2011 | Koivunen et al. | 455/296 |
| 8,126,404 B2 * | 2/2012 | Rached et al. | 455/67.11 |
| 8,160,121 B2 * | 4/2012 | Forenza et al. | 375/141 |
| 8,179,926 B2 * | 5/2012 | Futami et al. | 370/516 |
| 8,213,957 B2 * | 7/2012 | Bull et al. | 455/456.1 |
| 8,254,281 B2 * | 8/2012 | Hadad et al. | 370/252 |
| 8,355,675 B2 * | 1/2013 | Roh et al. | 455/63.1 |
| 8,379,739 B2 * | 2/2013 | Bury | 375/260 |
| 8,396,141 B2 * | 3/2013 | Lindoff et al. | 375/260 |
| 8,401,487 B2 * | 3/2013 | Dent et al. | 455/67.11 |
| 8,416,759 B1 * | 4/2013 | Narasimhan et al. | 370/344 |
| 8,599,956 B1 * | 12/2013 | Mitchell | 375/285 |
| 8,619,672 B2 * | 12/2013 | Tsai et al. | 370/328 |
| 8,638,259 B2 * | 1/2014 | Harper et al. | 342/357.43 |
| 8,639,243 B2 * | 1/2014 | Radulescu et al. | 455/434 |
| 8,666,327 B2 * | 3/2014 | Sang et al. | 455/75 |
| 8,750,876 B2 * | 6/2014 | Dimou et al. | 455/436 |
| 8,787,857 B2 * | 7/2014 | Ezaki | 455/226.1 |
| 8,831,633 B2 * | 9/2014 | Moshfeghi | 455/456.1 |
| 8,902,961 B1 * | 12/2014 | Nabar et al. | 375/225 |
| 8,913,651 B2 * | 12/2014 | Li et al. | 375/224 |
| 8,917,663 B2 * | 12/2014 | Khoury | 370/328 |
| 8,917,687 B2 * | 12/2014 | Shi et al. | 370/329 |
| 8,934,853 B2 * | 1/2015 | Lorenz et al. | 455/75 |
| 8,954,103 B2 * | 2/2015 | Kruglick | 455/501 |
| 8,971,380 B2 * | 3/2015 | Forenza et al. | 375/141 |
| 2003/0053412 A1 * | 3/2003 | Yoshida et al. | 370/208 |
| 2003/0218565 A1 * | 11/2003 | Budic | 342/90 |
| 2004/0157646 A1 * | 8/2004 | Raleigh et al. | 455/562.1 |
| 2004/0165568 A1 * | 8/2004 | Weinstein | 370/344 |
| 2004/0203395 A1 * | 10/2004 | Chizhik et al. | 455/63.1 |
| 2004/0248519 A1 * | 12/2004 | Niemela | 455/67.11 |
| 2006/0133211 A1 * | 6/2006 | Yang | 367/154 |
| 2007/0258408 A1 * | 11/2007 | Alizadeh-Shabdiz et al. | 370/331 |
| 2008/0081565 A1 | 4/2008 | Kim | |
| 2008/0171515 A1 * | 7/2008 | Kim et al. | 455/63.1 |
| 2008/0280625 A1 * | 11/2008 | Larsen | 455/456.1 |
| 2009/0003617 A1 * | 1/2009 | Goldman et al. | 381/71.12 |
| 2009/0016328 A1 * | 1/2009 | Peisa et al. | 370/352 |
| 2009/0111411 A1 * | 4/2009 | Koivunen et al. | 455/226.1 |
| 2009/0232257 A1 * | 9/2009 | Bury | 375/341 |
| 2009/0262006 A1 | 10/2009 | McNeill et al. | |
| 2009/0286485 A1 * | 11/2009 | Tomokiyo et al. | 455/67.16 |
| 2009/0290665 A1 * | 11/2009 | Yoshida et al. | 375/347 |
| 2009/0310505 A1 * | 12/2009 | Tsai et al. | 370/252 |
| 2010/0080178 A1 | 4/2010 | Cox et al. | |
| 2010/0118990 A1 * | 5/2010 | Lee et al. | 375/260 |
| 2010/0317293 A1 * | 12/2010 | Yokoyama | 455/63.1 |
| 2011/0026616 A1 | 2/2011 | Sestok et al. | |
| 2011/0074633 A1 * | 3/2011 | Pun et al. | 342/442 |
| 2011/0158361 A1 * | 6/2011 | Dent et al. | 375/347 |
| 2011/0182230 A1 * | 7/2011 | Ohm et al. | 370/315 |
| 2011/0202278 A1 * | 8/2011 | Caute et al. | 702/14 |
| 2011/0207456 A1 * | 8/2011 | Radulescu et al. | 455/434 |
| 2011/0216865 A1 * | 9/2011 | Qi et al. | 375/371 |
| 2011/0243288 A1 * | 10/2011 | Cheng et al. | 375/362 |
| 2011/0255428 A1 * | 10/2011 | Park et al. | 370/252 |
| 2011/0280205 A1 * | 11/2011 | Qin et al. | 370/329 |
| 2011/0281574 A1 * | 11/2011 | Patel et al. | 455/422.1 |
| 2011/0293052 A1 | 12/2011 | Serbetli | |
| 2012/0086606 A1 * | 4/2012 | Mathews et al. | 342/461 |
| 2012/0115423 A1 * | 5/2012 | Sang et al. | 455/75 |
| 2012/0315915 A1 * | 12/2012 | Ohm et al. | 455/440 |
| 2012/0316938 A1 * | 12/2012 | Moshfeghi | 705/14.16 |
| 2012/0316939 A1 * | 12/2012 | Moshfeghi | 705/14.16 |
| 2012/0316940 A1 * | 12/2012 | Moshfeghi | 705/14.16 |
| 2012/0316941 A1 * | 12/2012 | Moshfeghi | 705/14.16 |
| 2013/0029685 A1 * | 1/2013 | Moshfeghi | 455/456.1 |
| 2013/0039319 A1 * | 2/2013 | Shi et al. | 370/329 |
| 2013/0084884 A1 * | 4/2013 | Teyeb et al. | 455/456.1 |
| 2013/0113660 A1 * | 5/2013 | Tufvesson et al. | 342/450 |
| 2013/0170590 A1 * | 7/2013 | Hyll et al. | 375/343 |
| 2013/0201972 A1 * | 8/2013 | Alexander et al. | 370/336 |
| 2014/0064247 A1 * | 3/2014 | Teyeb et al. | 370/331 |
| 2014/0119334 A1 * | 5/2014 | Kazmi et al. | 370/330 |
| 2014/0192763 A1 * | 7/2014 | Eriksson et al. | 370/329 |
| 2014/0248907 A1 * | 9/2014 | Peroulas | 455/456.1 |
| 2014/0376657 A1 * | 12/2014 | Agee et al. | 375/267 |
| 2015/0003431 A9 * | 1/2015 | Baligh et al. | 370/337 |

FOREIGN PATENT DOCUMENTS

| | | |
|---|---|---|
| EP | 1 052 784 B1 | 8/2006 |
| EP | 2 251 992 | 11/2010 |
| WO | 00/04651 A1 | 1/2000 |
| WO | 2007/054406 A1 | 5/2007 |

OTHER PUBLICATIONS

3GPP TS 36.104 V9.5.0, $3^{rd}$ Generation Partnership Project; Technical Specification Group Radio Access Network; Evolved Universal Terrestrial Radio Access (E-UTRA); Base Station (BS) radio transmission and reception (Release 9), Sep. 2010.

3GPP TS 36.141 V8.8.0, $3^{rd}$ Generation Partnership Project; Technical Specification Group Radio Access Network; Evolved Universal Terrestrial Radio Access (E-UTRA); Base Station (BS) conformance testing (Release 8), Sep. 2010.

International Search Report and Written Opinion mailed Sep. 20, 2012 in PCT Application No. PCT/CN2011/083527.

(56) References Cited

OTHER PUBLICATIONS

TD-SCDMA 3G Mobile Communication System [M]. People Telecommunication Press. p. 113-116.
PCT International Preliminary Report on Patentability for International Application No. PCT/CN2011/083527, Sep. 5, 2012.
PCT International Search Report for International Application No. PCT/CN2011/083527, Sep. 20, 2012.
PCT Written Opinion for International Application No. PCT/CN2011/083527, Sep. 5, 2012.
Extended European Search Report for Application No./Patent No. 11877097.3-1854 / 2789111 PCT/CN2011083527, Feb. 27, 2015.

* cited by examiner

Fig. 7
Velocity of High Speed Train

Fig. 8
Location of High Speed Train

Fig. 9(a)

DOPPLER SHIFT COMPENSATION APPARATUS AND METHOD

This application is the U.S. national phase of International Application No. PCT/CN2011/083527 filed 6 Dec. 2011 which designated the U.S., the entire contents of each of which are hereby incorporated by reference.

TECHNICAL FIELD

The disclosure relates to wireless communication systems, and more particularly, to a Doppler shift compensation apparatus and method in a wireless communication system.

BACKGROUND

LTE and LTE-A aim at addressing the increasing requirements for broad band services in high user density areas while maintaining good performance in extreme channel condition such as high mobility of high speed trains. Scale and speed of High-Speed Rail/Highway (HSR/HSH) are rising continually. The top operation speed of HSR even reaches 380 km/h.

Increasing of speed will result in decreasing communication quality of passengers. Effect of Doppler is obvious and Doppler shift produces a greater negative impact on quality of mobile communication traffic in HSR/HSH. Therefore, communication operators and equipment manufacturers are anxious to resolve related issues. Users have great potential requirements in the scenario. And mobile communication coverage has its specified characters in HSR/HSH comparing with that of other scenarios.

(1) Nowadays most of LTE and LTE-A Base Stations (BS) are deployed at high frequencies (e.g., 2.6 GHz) which results in higher Doppler shift than that of low frequencies (e.g., 700 MHz).

(2) Variety of Doppler shift is not frequency linearity. It depends on not only the speed of UE but also the angle between moving direction of UE and BS.

(3) UE goes through a cell in a very short time, which results in the frequentness of Doppler shift are changed quickly. That will increase frequency shift, Block Error Rate (BLER), etc.

In radio access network, there are a lot of standards (2G/3G) consider the effect of Doppler, especially for LTE and LET-A (4G). LTE and LTE-A adopt OFDM requiring carries orthogonal. Restraining Inter-Cell Interference (ICI), estimating and compensating frequency shift are vital technologies. Therefore issues of Doppler shift are important for mobile communication system.

Standards [1] [2] [3] of 3GPP special describe propagation conditions of high speed train scenario. They show the simulation results of Doppler shift trajectory. However they just suppose the velocity is uniform and doesn't propose any methods to overcome Doppler shift.

SUMMARY

To solve the above problems, a Doppler shift compensation scheme applicable in a wireless communication system is proposed in the present disclosure.

According to a first aspect of the present disclosure, there is provided a Doppler shift compensation apparatus, comprising: an angle measuring unit configured to measure Angle Of Arrival (AOA) information of a User Equipment (UE); a velocity calculating unit configured to calculate a velocity information of the UE based on the measured AOA information; a frequency shift estimating unit configured to estimate Doppler shift of the UE based on the measured AOA information and the calculated velocity of the UE; a frequency shift compensation triggering unit configured to trigger Doppler frequency shift compensation based on the estimated Doppler shift of the UE; and a frequency shift compensating unit configured to perform the Doppler frequency shift compensation based on a trigger instruction received from the frequency shift compensation triggering unit.

In an example, the frequency shift compensation triggering unit is configured to divide a full span of Doppler shift of a UE into a plurality of extents, and if Doppler shifts of the UE estimated in a first predetermined number of estimation periods fall in one and the same extent, the frequency shift compensation triggering unit is configured to determine the one and the same extent as a stable extent.

Furthermore, the frequency shift compensation triggering unit is configured to trigger, in a second predetermined number of estimation periods, the Doppler frequency shift compensation in a hybrid compensation mode with a median of the stable extent or with an average of the Doppler shifts of the UE estimated in the first predetermined number of estimation periods.

On the other hand, the frequency shift compensation triggering unit is configured to trigger, in each estimation period, the Doppler frequency shift compensation in an accurate compensation mode with the estimated Doppler shift of the UE, if the frequency shift compensation triggering unit determines no stable extent.

In another example, if the UE is moving from a Base Station (BS) to which the Doppler shift compensation apparatus belongs to another BS, the Doppler shift compensation apparatus is configured to transfer the estimated Doppler shifts in some periods of the first predetermined number of estimation periods to the other BS via an inter-BS interface; and/or if the UE is moving from another BS to a Base Station (BS) to which the Doppler shift compensation apparatus belongs, the Doppler shift compensation apparatus is configured to receive the estimated Doppler shifts in some periods of the first predetermined number of estimation periods from the other BS via an inter-BS interface, and the frequency shift estimating unit is configured to estimate Doppler shifts of the UE in the rest periods of the first predetermined number of estimation periods. The inter-BS interface can be X2 interface or S1 interface.

In still another example, the angle measuring unit is configured to measure the AOA information of the UE by using the UE's Channel Quality Index (CQI) reports reported respectively at a start point and an end point of an estimation period.

For example, the Doppler shift compensation apparatus can be used in a Long Term Evolution (LTE) system, an LTE-Advanced system, or a Time Division Synchronous Code Division Multiple Access (TD-SCDMA) system.

According to a second aspect of the present disclosure, there is provided a Doppler shift compensation method, comprising: measuring Angle Of Arrival (AOA) information of a User Equipment (UE); calculating a velocity information of the UE based on the measured AOA information; estimating Doppler shift of the UE based on the measured AOA information and the calculated velocity of the UE; and triggering and performing Doppler frequency shift compensation based on the estimated Doppler shift of the UE.

In an example, the Doppler frequency shift compensation triggering and performing step includes: if Doppler shifts of the UE estimated in a first predetermined number of estimation periods fall in one and the same extent, determining the one and the same extent as a stable extent, wherein a full span of Doppler shift of a UE is divided into a plurality of extents; and triggering, in a second predetermined number of estimation periods, the Doppler frequency shift compensation in a hybrid compensation mode with a median of the stable extent or with an average of the Doppler shifts of the UE estimated in the first predetermined number of estimation periods.

The Doppler frequency shift compensation triggering and performing step further includes: triggering, in each estimation period, the Doppler frequency shift compensation in an accurate compensation mode with the estimated Doppler shift of the UE, if no stable extent is determined.

In another example, the Doppler shift compensation method further includes: if the UE is moving from a Base Station (BS) to another BS, transferring the estimated Doppler shifts in some periods of the first predetermined number of estimation periods from the BS to the other BS via an inter-BS interface.

In still another example, the Doppler shift compensation method further includes: if the UE is moving from an originating Base Station (BS) to a destination BS, receiving, at the destination BS, the estimated Doppler shifts in some periods of the first predetermined number of estimation periods from the originating BS via an inter-BS interface, and estimating, at the destination BS, Doppler shifts of the UE in the rest periods of the first predetermined number of estimation periods. The inter-BS interface can be X2 interface or S1 interface.

In yet another example, the AOA information of the UE I measured by using the UE's Channel Quality Index (CQI) reports reported respectively at a start point and an end point of an estimation period.

For example, the Doppler shift compensation method can be used in a Long Term Evolution (LTE) system, an LTE-Advanced system, or a Time Division Synchronous Code Division Multiple Access (TD-SCDMA) system.

BRIEF DESCRIPTION OF THE DRAWINGS

The above and other objects, features and advantages of the present disclosure will be clearer from the following detailed description about the non-limited embodiments of the present disclosure taken in conjunction with the accompanied drawings, in which.

DETAILED DESCRIPTION OF EMBODIMENTS

Hereunder, the embodiments of the present disclosure will be described in accordance with the drawings. In the following description, some particular embodiments are used for the purpose of description only, which shall not be understood as any limitation to the present disclosure but the examples thereof. While it may blur the understanding of the present disclosure, the conventional structure or construction will be omitted.

Figure 1:
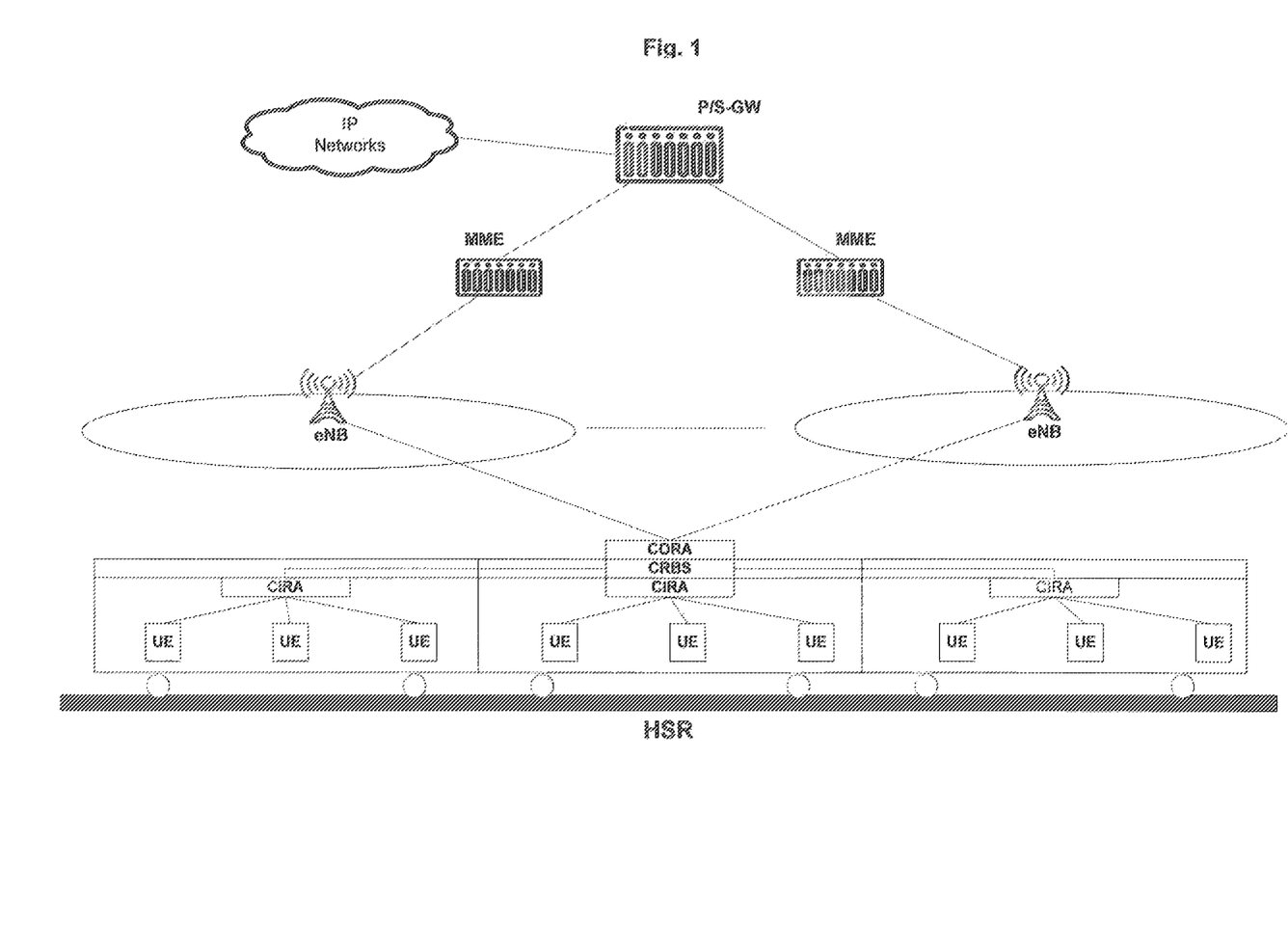
FIG. 1 is a schematic diagram illustrating a relay UE communication scenario in High Speed Railway (HSR) environment.

FIG. 1 is a schematic diagram illustrating a relay UE communication scenario in High Speed Railway (HSR) (generally with a top speed higher than 250 km/h) environment.

As shown in FIG. 1, systems and apparatuses on a train are in high speed environments, and communication signal is bidirectional transferred between BS (e.g., eNB) and Car Radio Base Station (CRBS). The CRBS together with its CORA (Car Outside Roof Antenna) and CIRA (Car Inside Roof Antenna) consist of a UE relay subsystem. If we aim to get good communication quality, effect of Doppler need be overcome.

Figure 2:
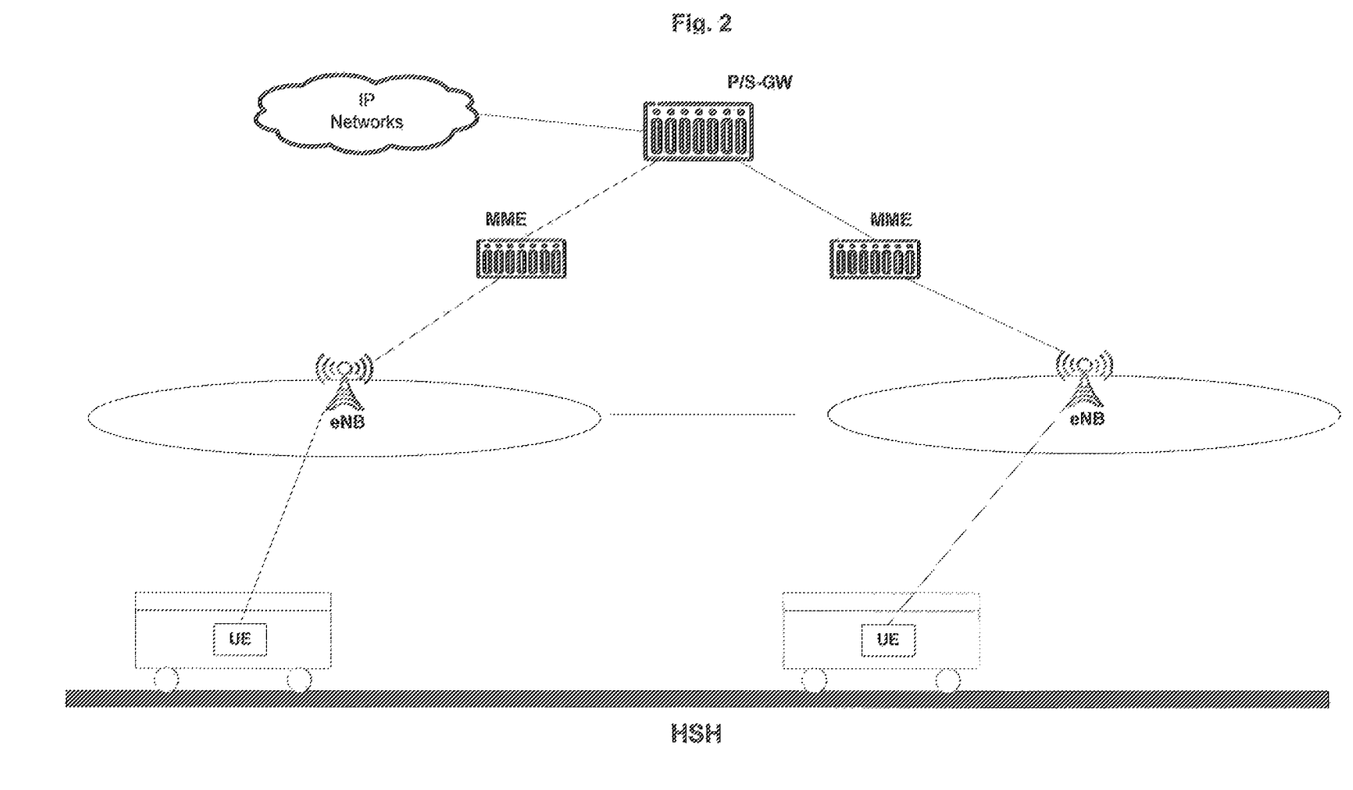
FIG. 2 is a schematic diagram illustrating a relay UE communication scenario in High Speed Highway (HSH) environment.

FIG. 2 is a schematic diagram illustrating a relay UE communication scenario in High Speed Highway (HSH) (generally with a top speed higher than 120 km/h) environment.

In FIG. 2, there are not any relay nodes. UE communicates with BS (e.g., eNB) directly. If Doppler shift is not compensated, the signal quality between UE and BS will be poor.

In the following description, the embodiment of the present disclosure will be detailed in conjunction with the HSR environment as an example. However, it is noted that the embodiment of the present disclosure can be applied to the HSH environment with appropriate adaptations, such as replacing height of train ($H_{train}$) with height of car ($H_{car}$) and replacing distance between BS and rail ($D_{bs2rail}$) with distance between BS and highway ($D_{bs2highway}$).

Figure 3:
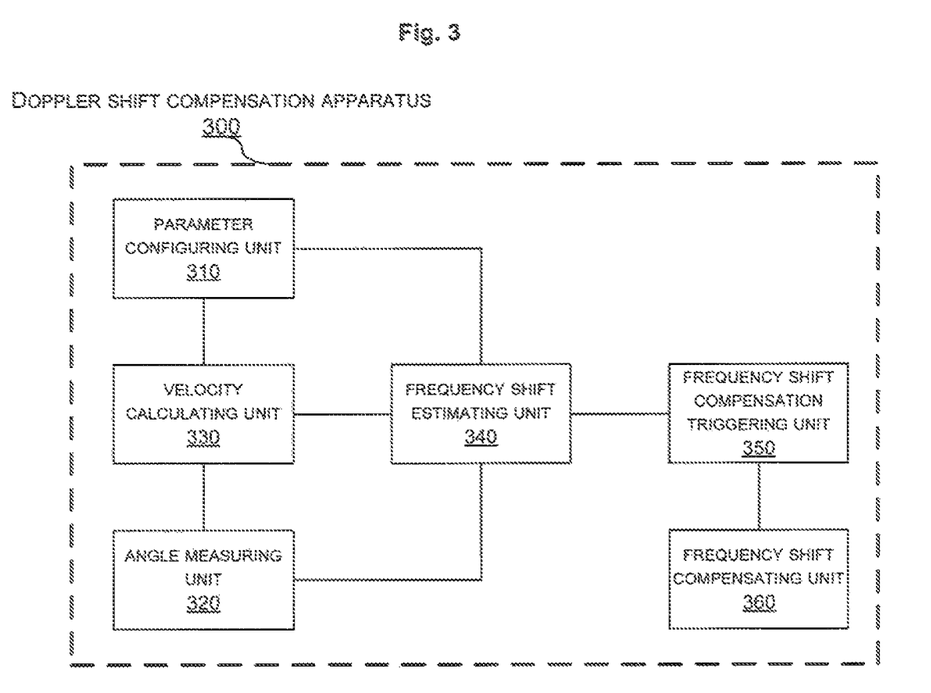
FIG. 3 is a block diagram illustrating a Doppler shift compensation apparatus 300 according to an embodiment of the present disclosure.

FIG. 3 is a block diagram illustrating a Doppler shift compensation apparatus 300 according to an embodiment of the present disclosure.

As shown in FIG. 3, the Doppler shift compensation apparatus 300 includes a parameter configuring unit 310, an angle measuring unit 320, a velocity calculating unit 330, a frequency shift estimating unit 340, a frequency shift compensation triggering unit 350 and a frequency shift compensating unit 360.

The parameter configuring unit 310 is mainly for setting system information including heights of BS and UE/train ($H_{bs}$ and $H_{train}$), radius of cell (Radius), distance between BS and rail ($D_{bs2rail}$), and central frequency ($f_c$) for communication with UE. These parameters are physical information influencing on Doppler frequency shift. The parameters in the parameter configuring unit 310 can be configured via a local maintain terminal or an Operations Support Systems (OSS).

The angle measuring unit 320 is responsible for measuring Angle of Arrival (AOA) of signals from UE/train. UEs and BSs of LTE and LTE-A system have multi-antenna in order to support MIMO feature. One of UE's antennas can connect to antennas of BS in uplink according to standards of 3GPP. UE reports its CQI (Channel Quality Index) periodically. Therefore, the angle measuring unit 320 can calculate AOA of signals from UE/train by using this CQI report, for example, by adopting any suitable existing techniques. By using two consecutive CQI reports in a period (Δt), AOAs (β and β' in FIG. 4) at the beginning and ending of this period can be measured by the angle measuring unit 320.

The velocity calculating unit 330 can calculate velocity (v) of UE/train based on the information of the parameter configuring unit 310 and the angle measuring unit 320. The velocity calculating unit 330 can calculate the velocity by difference of angle and physical information in the period. The period (Δt) can be set by multiple of 10 ms. The shorter the period (Δt) is, the higher the accuracy but more overhead. The longer the period (Δt) is, the lower the accuracy but less overhead. Therefore, according to system requirements, the period (Δt) can be set based on tradeoff between accuracy and overhead.

Figure 4:
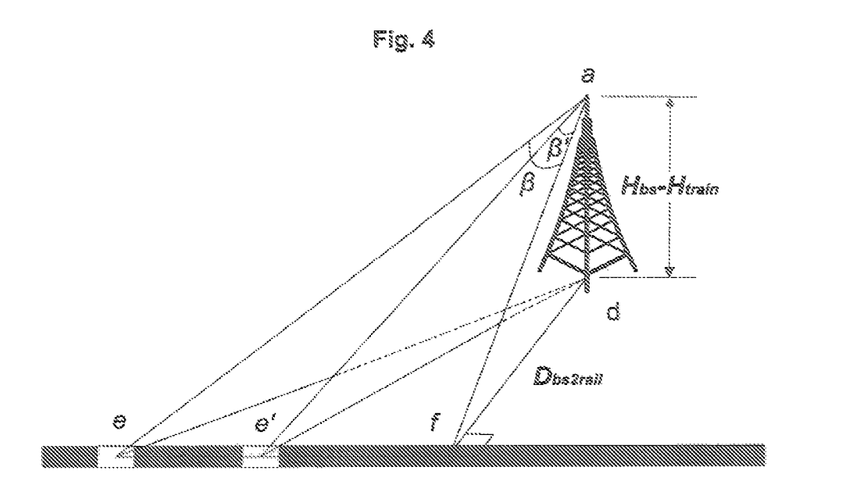
FIG. 4 is a schematic diagram illustrating a system model for HSR.

FIG. 4 is a schematic diagram illustrating a system model for HSR.

In FIG. 4, a train moves from a point e to another point e' in a period of Δt. The AOAs at the beginning and ending of this period of Δt measured by the angle measuring unit 320 is β and β', respectively. Therefore, the velocity calculating unit 330 calculates the velocity (v) of UE in the train as $$v = \frac{\sqrt{(H_{bs} - H_{train})^2 + D_{bs2rail}^2} * (tg\beta - tg\beta')}{\Delta t} \quad (1)$$

The frequency shift estimating unit 340 estimates the Doppler shift depending on the measured AOAs, the calculated velocity of UE/train and the configured central frequency for communications with the UE. Referring again to FIG. 4, with the measured AOA β', the calculated velocity v of UE/train, the configured central frequency $f_c$ for communications with UE and speed of light c in vacuum, the frequency shift estimating unit 340 estimate the Doppler shift $f_d$ as $$f_d = f_c * \frac{v}{c} * \sin\beta' \quad (2)$$
$$= f_c * \frac{\sqrt{(H_{bs} - H_{train})^2 + D_{bs2rail}^2} * (tg\beta - tg\beta')}{c * \Delta t} * \sin\beta'$$

After checking the triggering conditions, the frequency shift compensation triggering unit 350 may trigger the frequency shift compensating unit 360 to perform frequency compensation on basis of the estimated Doppler shift $f_d$ output from the frequency shift estimating unit 340. According to this embodiment of the present disclosure, two compensation modes are provided, one is accurate compensation mode and the other is hybrid compensation mode. In the accurate compensation mode, the frequency shift compensating unit 360 is triggered in each period to compensate the exact Doppler shift estimated by the frequency shift estimating unit 340. In the hybrid compensation mode, the frequency shift compensating unit 360 is triggered after stepping examinations on estimated Doppler shift extent in stable phase. In the hybrid compensation mode, the full span of Doppler shifts of UE are divided into several extents, and for each extent, the Doppler shift is compensate with the median of the extent. For example, a full span [0, 850 Hz] of Doppler shifts of UE is divided into three extents, [0, 200 Hz), [200 Hz, 650 Hz) and [650 Hz, 850 Hz]. If the Doppler shift estimated by the frequency shift estimating unit 340 falls in [650 Hz, 850 Hz] stably, the frequency shift compensating unit 360 is triggered to compensate a Doppler shift of 750 Hz.

Figure 5:
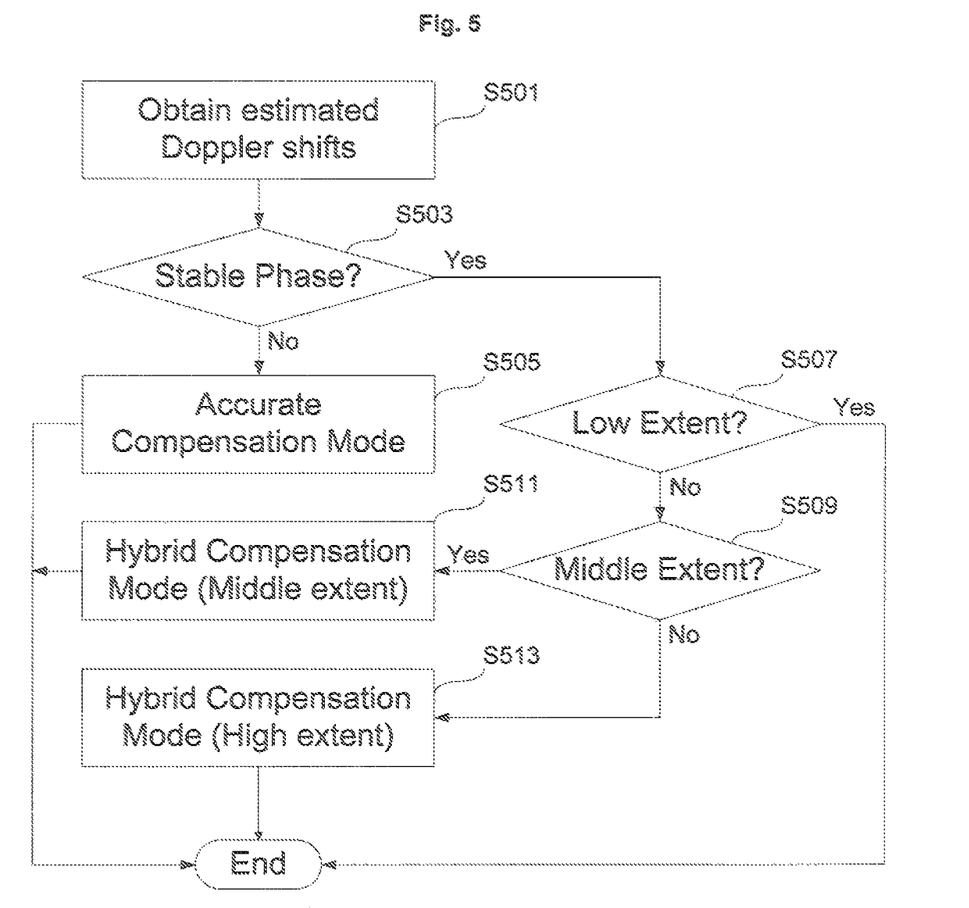
FIG. 5 is a flowchart illustrating the operations of the frequency shift compensation triggering unit 350 according to the embodiment of the present disclosure, with the three divided extents as an example.

FIG. 5 is a flowchart illustrating the operations of the frequency shift compensation triggering unit 350 according to the embodiment of the present disclosure, with the three divided extents as an example.

In FIG. 5, at step S501, the frequency shift compensation triggering unit 350 obtains a plurality of estimated Doppler shifts in a first predetermined number (e.g. $n_1$=5) of periods from the frequency shift estimating unit 340. At step S503, the frequency shift compensation triggering unit 350 determines whether or not the estimated Doppler shifts are in a stable phase. For example, if the change of Doppler shift is less than 50 Hz per second, the phase is determined to be stable. Otherwise, the phase is determined to be rapid change. If the Doppler shifts are in a rapid change phase (not stable) (step S503: No), at step S505, the frequency shift compensation triggering unit 350 triggers the frequency shift compensating unit 360 in each period (e.g. 50 ms) to compensate the exact Doppler shift estimated by the frequency shift estimating unit 340 (accurate compensation mode). If the Doppler shifts are in the stable phase (step S503: Yes), at steps S507 and S509, the frequency shift compensation triggering unit 350 determines in which extent the Doppler shifts are. If the Doppler shifts are in low extent (e.g. [0, 200 Hz)) (step S507: Yes), the frequency shift compensation triggering unit 350 does not trigger the frequency shift compensating unit 360 at all because the UE is now determined as moving slowly. If the Doppler shifts are in middle extent (e.g. [200 Hz, 650 Hz)) (step S509: Yes), at step S511, the frequency shift compensation triggering unit 350 triggers the frequency shift compensating unit 360 in a second predetermined number (e.g. $n_2$=20) of periods to compensate the median of the middle extent (e.g. (200 Hz+650 Hz)/2=425 Hz) (hybrid compensation mode). If the Doppler shifts are in high extent (e.g. [650 Hz, 850 Hz]) (step S509: No), at step S513, the frequency shift compensation triggering unit 350 triggers the frequency shift compensating unit 360 in a third predetermined number (e.g. $n_3$=10) of periods to compensate the median of the high extent (e.g. (650 Hz+850 Hz)/2=750 Hz) (hybrid compensation mode). The first, second and third predetermined numbers can be identical (e.g., later in [Simulation] section) or different (e.g., as above) according to the system requirements.

In this regard, the Doppler shifts in stable phase can be compensated with less overhead and the compensation adjusting times can be decreased.

Alternatively, in the hybrid compensation mode, an average of the plurality of estimated Doppler shifts in the first predetermined number (e.g., 5) of periods from the frequency shift estimating unit 340 can be calculated. With this average of the estimated Doppler shifts, the frequency shift compensating unit 360 can be triggered in the second or third predetermined number of periods to compensate the calculated average Doppler shifts.

Furthermore, if during the first predetermined number (e.g., 5) of periods, a UE is moving from originating BS to destination BS, handover of the UE will occur between these two BSs. For example, at the time of UE's handover, the originating $BS_1$ has estimated the Doppler shifts of the UE in the first 2 periods by its frequency shift estimating unit 340. Then, the originating $BS_1$ will transfer the estimated Doppler shifts in the first 2 periods to the destination $BS_2$. The destination $BS_2$ will estimate the Doppler shifts of the UE in the remaining 3 periods by its frequency shift estimating unit 340. Thereafter, the Doppler shifts in the first 2 periods estimated by the originating $BS_1$ and the Doppler shifts in the remaining 3 periods estimated by the destination $BS_2$ will be both input into frequency shift compensation triggering unit 350 of the destination $BS_2$. These two BSs are communicating with inter-BS interface (such as X2 interface or S1 interface in LTE system). If these two BSs are connected to the same Mobility Management Entity (MME), the estimation information can be transferred via X2 interface from the originating BS to the destination BS. If these two BSs are connected to different MME, the estimation information can be transferred via S1 interface from the originating BS to the destination BS. The X2 interface and S1 interface are interfaces available in LTE and LTE-A system, and therefore, the detailed descriptions thereof are omitted for simplicity.

The frequency shift compensating unit 360 compensates the frequency shift based on the instructions from the frequency shift compensation triggering unit 350. Any existing Doppler frequency shift compensation method can be used. For simplicity and clarity, the detailed descriptions are omitted.

[Simulation]

Figure 6:
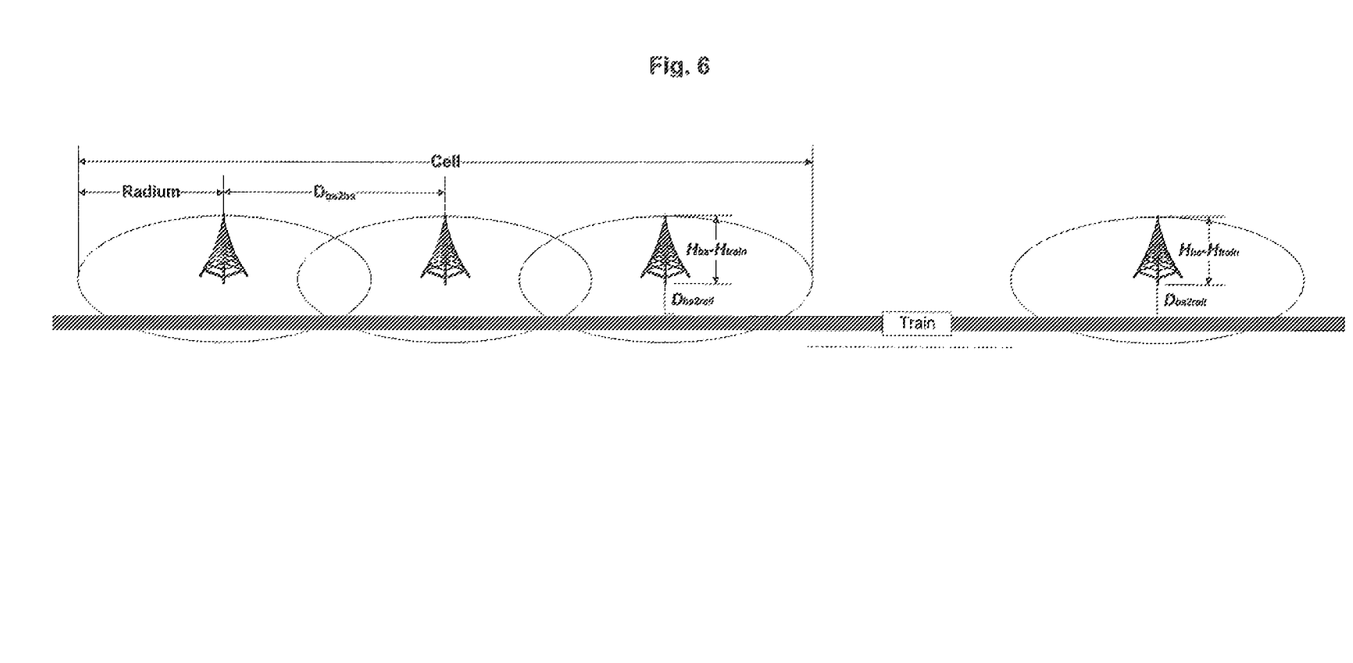
FIG. 6 is a schematic diagram illustrating a simulation scenario for HSR. In this simulation scenario the following parameters are used.

FIG. 6 is a schematic diagram illustrating a simulation scenario for HSR. In this simulation scenario the following parameters are used.

TABLE 1

Parameters

| Parameters | Value | Annotation |
|---|---|---|
| $H_{bs}$ | 35 m | Height of BS |
| $H_{train}$ | 5 m | Height of train |
| $D_{bs2rail}$ | 100 m | Distance between BS and rail |
| $f_c$ | 2.6 GHz | Central frequency for communication with UE |
| Cell | 3 BSs | A cell contains 3 BS |
| Radius | 2000 m | Coverage Radius of a BS |
| $D_{bs2bs}$ | 3600 m | Distance between two BS |
| Time | 500 s | Simulation time |
| $\Delta t$ | 10 ms | Estimation Period |
| $n_1$ | 5 | Stable Phase Check Periods counted by $\Delta t$ |
| $n_2$ | $n_1$ | Hybrid Compensation Periods for Middle Extent |
| $n_3$ | $n_1$ | Hybrid Compensation Periods for High Extent |

Three BSs form a cell (Cell). Radius of a cell (Radius) is 2000 m and distance between two BSs ($D_{bs2bs}$) is 3600 m. In addition, simulation time (Time) is 500 seconds. Heights of BS and UE/train ($H_{bs}$ and $H_{train}$) are 35 m and 5 m respectively.

Distance between BS and rail ($D_{bs2rail}$) is 100 m. The central frequency ($f_c$) for communication with UE is 2.6 GHz. In simulation, for simplicity and easy-understanding, the first, second and third predetermined numbers ($n_1$, $n_2$, and $n_3$) are set identical to one another as $n_1=n_2=n_3=5\Delta t=50$ ms.

Figure 7:
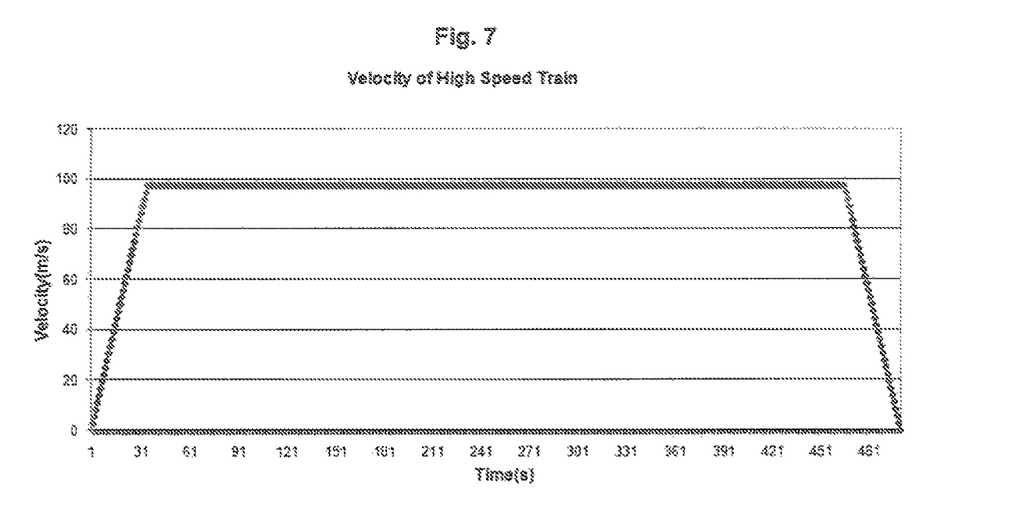
FIG. 7 is a graph showing the velocity of the high speed train.
Figure 8:
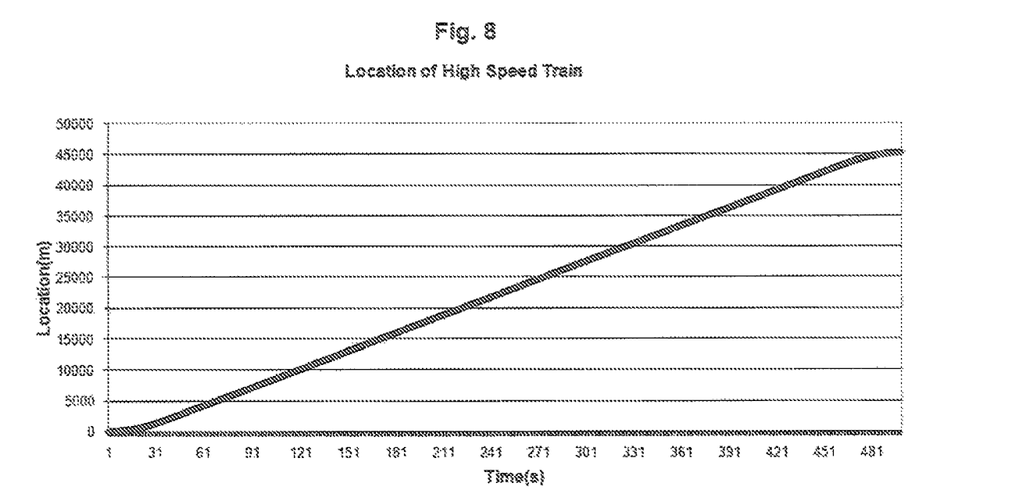
FIG. 8 is a graph showing corresponding location information of the high speed train.

FIG. 7 is a graph showing the velocity of the high speed train. As shown in FIG. 7, the first phase is in accelerated status (time: 1~35 s, velocity: 0~350 km/h). The second phase is in even status (time: 36~465 s, velocity: 350 km/h). The last phase is in decelerated status (time: 466~500 s, velocity: 350~0 km/h). FIG. 8 is a graph showing corresponding location information of the high speed train.

Figure 9A:
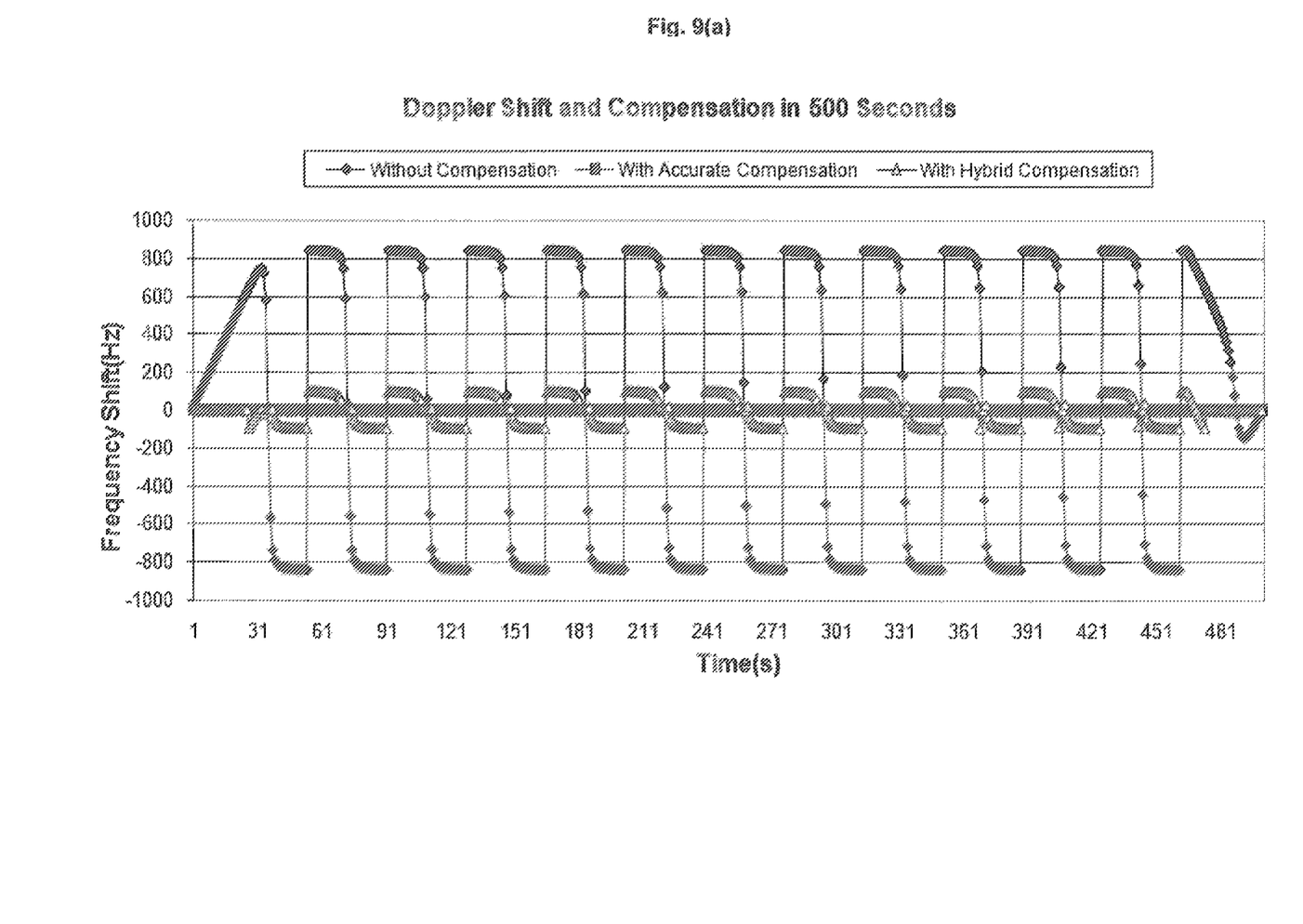
FIGS. 9(a)-9(c) are graphs showing the simulation results of Doppler shifts and compensations.
Figure 9B:
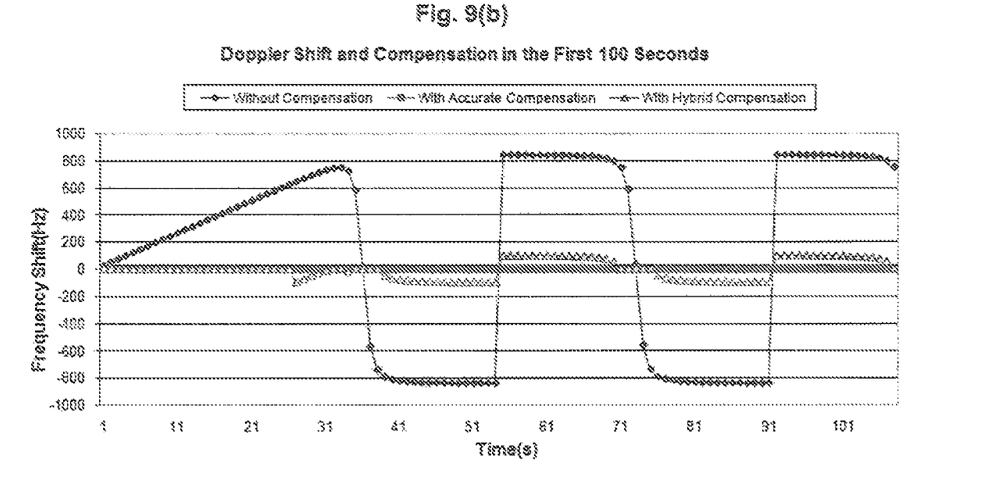
Figure 9C:
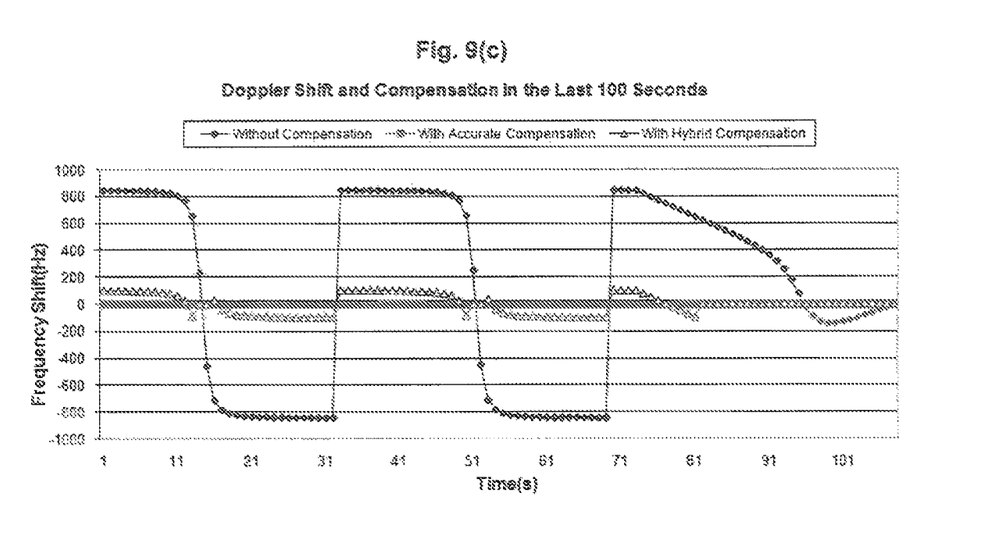

FIGS. 9(a)-9(c) are graphs showing the simulation results of Doppler shifts and compensations.

FIG. 9(a) shows the full span of the simulation time of 500 seconds, FIG. 9(b) shows the accelerated status in the first 100 seconds, and FIG. 9(c) shows the decelerated status in the last 100 seconds. In FIGS. 9(a)-9(c), diamond-marked curve shows Doppler shift without compensation. The maximum frequency shift is about 842 Hz. And the maximum variety is in the edge of two base stations. The frequency shift is about 1684 Hz. Square-marked curve indicates the frequency shift is with accurate compensation. The curve is almost equal to zero. However, it means system should adjust the compensation value frequently. Triangle-marked curve shows the frequency shift is with hybrid mode compensation. The compensation extent is set to [642, 842] and [−842, −642] in stable phase. Medians of them are 742 and −742. The compensation adopts accurate mode in rapid change phase. This means system can decrease compensation adjusting times and achieve tradeoff. Proportion of stable phase to rapid change phase is about 10:1.

The present disclosure can provide a solution to estimate Doppler shift in HSR/HSH, especially, for radio networks of LTE and LTE-A. The present disclosure also proposes trigger decision methods in hybrid or accurate modes to compensate Doppler shift. The hybrid mode can decrease computer complexity and compensation times. The present disclosure may resolves issues of Doppler shift compensation including intra-BS and inter-BS. Inter-BS estimation information can be transferred by X2 or S1 interface in LTE and LTE-A. The present disclosure may improve communication system signal quality and increase throughput.

This disclosed technology can be implemented in BSs without any modifications of UEs. This disclosed technology is suitable for high mobility scenarios. It can compensate Doppler shift and improve signal quality. The disclosed technology can be used in any suitable system with AOA measurement capabilities, for example, LTE (such as TD-LTE, FD-LTE), LTE-Advanced (such as TD-LTE-A, FD-LTE-A), TD-SCDMA, etc.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

AOA Angle Of Arrival
BLER Block Error Ratio
BS Base Station
CIRA Car Inside Roof Antenna
CORA Car Outside Roof Antenna
CRBS Car Radio Base Station
eNB Evolved Node B
HSR High Speed Railway
HSH High Speed Highway
ICI Inter-Cell Interference
LOS Line Of Sight
LTE Long Term Evolution
MIMO Multiple Input Multiple Output
MME Mobility Management Entity
OSS Operation Support System
P/S GW Packet/Service Gateway
TD-LTE Time Division Long Term Evolution
FD-LTE Frequency Division Long Term Evolution
TD-SCDMA Time Division Synchronous Code Division Multiple Access
UE User Equipment

REFERENCES

[1] 3GPP TS 36.101, Evolved Universal Terrestrial Radio Access (E-UTRA); User Equipment (UE) radio transmission and reception Available: http://www.3gpp.org/ftp/Specs/html-info/36101.htm;
[2] 3GPP TS 36.104, Evolved Universal Terrestrial Radio Access (E-UTRA); Base Station (BS) radio transmission and reception Available: http://www.3gpp.org/ftp/Specs/html-info/36104.htm;

[3] 3GPP TS 36.141, Evolved Universal Terrestrial Radio Access (E-UTRA); Base Station (BS) conformance testing Available: http://www.3gpp.org/ftp/Specs/html-info/36141.htm.

What is claimed is:

1. A Doppler shift compensation apparatus, comprising:
an angle measuring unit configured to measure Angle Of Arrival (AOA) information of a User Equipment (UE);
a velocity calculating unit configured to calculate a velocity information of the UE based on the measured AOA information;
a frequency shift estimating unit configured to estimate Doppler shift of the UE based on the measured AOA information and the calculated velocity of the UE;
a frequency shift compensation triggering unit configured to trigger Doppler frequency shift compensation based on the estimated Doppler shift of the UE; and
a frequency shift compensating unit configured to perform the Doppler frequency shift compensation based on a trigger instruction received from the frequency shift compensation triggering unit.

2. The Doppler shift compensation apparatus according to claim 1, wherein
the frequency shift compensation triggering unit is configured to divide a full span of Doppler shift of a UE into a plurality of extents, and
if Doppler shifts of the UE estimated in a first predetermined number of estimation periods fall in one and the same extent, the frequency shift compensation triggering unit is configured to determine the one and the same extent as a stable extent.

3. The Doppler shift compensation apparatus according to claim 2, wherein
the frequency shift compensation triggering unit is configured to trigger, in a second predetermined number of estimation periods, the Doppler frequency shift compensation in a hybrid compensation mode with a median of the stable extent or with an average of the Doppler shifts of the UE estimated in the first predetermined number of estimation periods.

4. The Doppler shift compensation apparatus according to claim 2, wherein
the frequency shift compensation triggering unit is configured to trigger, in each estimation period, the Doppler frequency shift compensation in an accurate compensation mode with the estimated Doppler shift of the UE, if the frequency shift compensation triggering unit determines no stable extent.

5. The Doppler shift compensation apparatus according to claim 2, wherein
if the UE is moving from a Base Station (BS) to which the Doppler shift compensation apparatus belongs to another BS,
the Doppler shift compensation apparatus is configured to transfer the estimated Doppler shifts in some periods of the first predetermined number of estimation periods to the other BS via an inter-BS interface; and/or
if the UE is moving from another BS to a Base Station (BS) to which the Doppler shift compensation apparatus belongs,
the Doppler shift compensation apparatus is configured to receive the estimated Doppler shifts in some periods of the first predetermined number of estimation periods from the other BS via an inter-BS interface, and
the frequency shift estimating unit is configured to estimate Doppler shifts of the UE in the rest periods of the first predetermined number of estimation periods.

6. The Doppler shift compensation apparatus according to claim 5, wherein the inter-BS interface is X2 interface or S1 interface.

7. The Doppler shift compensation apparatus according to claim 1, wherein the angle measuring unit is configured to measure the AOA information of the UE by using the UE's Channel Quality Index (CQI) reports reported respectively at a start point and an end point of an estimation period.

8. The Doppler shift compensation apparatus according to claim 1, wherein the Doppler shift compensation apparatus is used in a Long Term Evolution (LTE) system, an LTE-Advanced system, or a Time Division Synchronous Code Division Multiple Access (TD-SCDMA) system.

9. A Doppler shift compensation method, comprising:
measuring Angle Of Arrival (AOA) information of a User Equipment (UE);
calculating a velocity information of the UE based on the measured AOA information;
estimating Doppler shift of the UE based on the measured AOA information and the calculated velocity of the UE; and
triggering and performing Doppler frequency shift compensation based on the estimated Doppler shift of the UE.

10. The Doppler shift compensation method according to claim 9, wherein the Doppler frequency shift compensation triggering and performing step includes:
if Doppler shifts of the UE estimated in a first predetermined number of estimation periods fall in one and the same extent, determining the one and the same extent as a stable extent, wherein a full span of Doppler shift of a UE is divided into a plurality of extents;
triggering, in a second predetermined number of estimation periods, the Doppler frequency shift compensation in a hybrid compensation mode with a median of the stable extent or with an average of the Doppler shifts of the UE estimated in the first predetermined number of estimation periods.

11. The Doppler shift compensation method according to claim 10, wherein the Doppler frequency shift compensation triggering and performing step further includes: triggering, in each estimation period, the Doppler frequency shift compensation in an accurate compensation mode with the estimated Doppler shift of the UE, if no stable extent is determined.

12. The Doppler shift compensation method according to claim 10, further comprising: if the UE is moving from a Base Station (BS) to another BS, transferring the estimated Doppler shifts in some periods of the first predetermined number of estimation periods from the BS to the other BS via an inter-BS interface.

13. The Doppler shift compensation method according to claim 10, further comprising:
if the UE is moving from an originating Base Station (BS) to a destination BS,
receiving, at the destination BS, the estimated Doppler shifts in some periods of the first predetermined number of estimation periods from the originating BS via an inter-BS interface, and
estimating, at the destination BS, Doppler shifts of the UE in the rest periods of the first predetermined number of estimation periods.

14. The Doppler shift compensation method according to claim 12, the inter-BS interface is X2 interface or S1 interface.

15. The Doppler shift compensation method according to claim 9, wherein the AOA information of the UE I measured by using the UE's Channel Quality Index (CQI) reports reported respectively at a start point and an end point of an estimation period.

16. The Doppler shift compensation method according to claim 9, wherein the Doppler shift compensation method is used in a Long Term Evolution (LTE) system, an LTE-Advanced system, or a Time Division Synchronous Code Division Multiple Access (TD-SCDMA) system.

* * * * *